United States Patent [19]

Muller et al.

[11] 4,255,518
[45] Mar. 10, 1981

[54] PROCESS FOR THE RECOVERY OF STARCH FROM CEREAL GRAINS AS AN AQUEOUS SLURRY

[75] Inventors: Werner C. Muller, Dobbs Ferry, N.Y.; Franklyn D. Miller, Cincinnati, Ohio

[73] Assignee: National Distillers and Chemical Corp., New York, N.Y.

[21] Appl. No.: 69,950

[22] Filed: Aug. 27, 1979

[51] Int. Cl.³ .............................. C13L 1/00; C12P 7/06
[52] U.S. Cl. ..................................... 435/161; 127/38; 127/68
[58] Field of Search ............... 127/68, 38; 435/163, 435/165, 161

[56] References Cited

U.S. PATENT DOCUMENTS

| | | | |
|---|---|---|---|
| 2,072,633 | 3/1937 | Greenfield | 127/68 |
| 2,124,779 | 7/1938 | Kelling | 127/68 |
| 2,206,024 | 7/1940 | Brown | 435/165 |
| 2,237,561 | 4/1941 | King | 127/68 |
| 2,251,448 | 8/1941 | Giesecke | 127/68 |
| 2,324,849 | 7/1943 | Kelling | 127/68 |
| 2,324,850 | 7/1943 | Kelling | 127/68 |
| 2,698,826 | 1/1955 | Peltzer | 127/68 X |
| 3,236,740 | 2/1966 | Smith | 435/161 |
| 4,035,515 | 7/1977 | Cunningham | 435/165 X |
| 4,106,487 | 8/1978 | Randall | 127/68 X |
| 4,201,596 | 5/1980 | Church | 435/165 X |
| 4,207,118 | 6/1980 | Bonnay | 127/24 |

Primary Examiner—Sidney Marantz
Attorney, Agent, or Firm—Kenneth D. Tremain

[57] ABSTRACT

In the wet milling of a cereal grain such as corn for the recovery of starch and other products therefrom, steepwater containing much of the water soluble components of the grain, e.g., carbohydrates, proteins and minerals, is utilized as process water for each of the individual milling, screening, concentrating and washing operations and the process water is thereafter recycled for use as steepwater in a subsequent starch recovery sequence.

8 Claims, 1 Drawing Figure

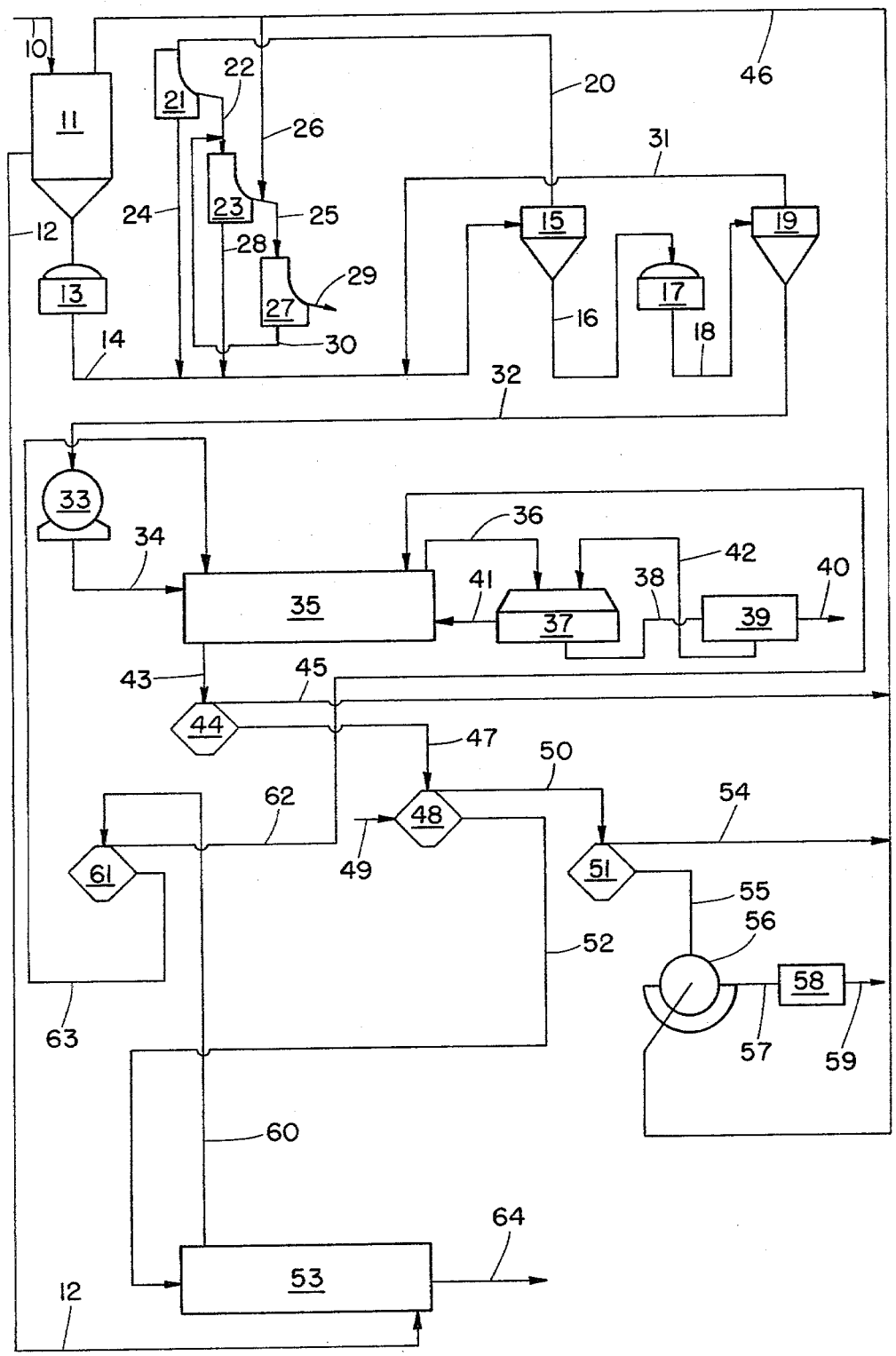

4,255,518

PROCESS FOR THE RECOVERY OF STARCH FROM CEREAL GRAINS AS AN AQUEOUS SLURRY

BACKGROUND OF THE INVENTION

1. Field of the Invention

This invention relates to the recovery of starch from cereal grains such as corn, wheat, rice, milo, and the like and, more particularly, to the recovery of starch from cereal grains in the form of an aqueous slurry.

2. Description of the Prior Art

With the ever-increasing depletion of economically recoverable petroleum reserves, the production of ethanol from vegetative sources as a partial or complete replacement for conventional fossil-based liquid fuels becomes more attractive. In some areas, the economic and technical feasibility of using a 90% unleaded gasoline—10% anhydrous ethanol blend ("gasohol") has shown encouraging results. According to a recent study, gasohol powered automobiles have averaged a 5% reduction in fuel compared to unleaded gasoline powered vehicles and have emitted one-third less carbon monoxide than the latter. In addition to offering promise as a practical and efficient fuel, biomass-derived ethanol in large quantities and at a competitive price has the potential in some areas for replacing certain petroleum-based chemical feedstocks. Thus, for example, ethanol can be catalytically dehydrated to ethylene, one of the most important of all chemical raw materials both in terms of quantity and versatility.

The various operations in processes for obtaining ethanol from such recurring sources as cellulose, cane sugar, amylaceous grains and tubers, e.g., the separation of starch granules from non-carbohydrate plant matter and other extraneous substances, the chemical and/or enzymatic hydrolysis of starch to fermentable sugar (liquefaction and saccharification), the fermentation of sugar to a dilute solution of ethanol ("beer") and the recovery of anhydrous ethanol by distillation, have been modified in numerous ways to achieve improvements in product yield, production rates and so forth (see, for example, U.S. Pat. No. 3,236,740 and the booklet "Industrial Alcohol by Continuous Fermentation and Vacuum Distillation With Low Energy Consumption", of Chemapec, Inc., Woodbury, N.Y. For ethanol to realize its vast potential as a partial or total substitute for petroleum fuels or as a substitute chemical feedstock, it is necessary that the manufacturing process be as efficient in the use of energy and raw materials as possible so as to maximize the energy return for the amount of ethanol produced and enhance the standing of the ethanol as an economically viable replacement for petroleum based raw materials. To date, however, relatively little concern has been given to the energy and raw material requirements for manufacturing ethanol from biomass and consequently, little effort has been made to minimize the thermal expenditure and waste incurred in carrying out any of the aforesaid discrete operations involved in the manufacture of ethanol from vegetative sources.

It is common practice to recover starch from corn in a sequence of operations featuring removal of germ from steeped corn, removal of fiber from the degerminated corn, separation of the corn starch from the gluten and washing and drying of the corn starch to provide a food grade material suitable for use per se or for conversion to sugar (see, for example, the booklet "Corn Wet Milling Processes and Equipment From Dorr-Oliver", of Dorr-Oliver Incorporated, Stamford, Conn.). Under the process conditions of this and similar starch recovery procedures, soluble carbohydrates and proteins present in the grain are discarded or otherwise separated from the starch. While this loss of soluble carbohydrates and proteins is not considered a problem in the starch and sugar industries where the purity and quality of the end product is of paramount importance, it represents a substantial disadvantage to the full and efficient utilization of grain starch as a raw material for the production of inexpensive industrial ethanol. The loss of soluble carbohydrate which represents a significant portion of the total quantity of carbohydrate present in cereal grains accounts for a substantial diminution of raw material which would be useful for ultimate conversion to ethanol. Similarly, the loss of soluble protein which would otherwise be available to satisfy the nutritive requirements of yeast employed in the conversion of fermentable sugar obtained by hydrolysis of the starch further militates against the use of current procedures for the recovery of starch from cereal grains.

Accordingly, there has heretofore existed a need for a process for recovering starch from cereal grains which does not result in the removal of substantial quantities of water soluble carbohydrate and/or protein therefrom.

SUMMARY OF THE INVENTION

In accordance with the starch recovery process herein, a dried, cleaned cereal grain such as shelled corn is steeped for softening and thereafter milled to release the oil-containing germ. The steepwater which is removed after this softening step is used in the last step of the process, e.g., a starch washing operation, and recycled through the preceding steps of the process to be eventually re-used as steepwater for a fresh quantity of grain. In this way, substantially all of the water soluble carbohydrate, protein and minerals extracted from the grain during steeping and the subsequent process steps of the process will be retained in the product starch slurry and will be available for consumption by yeast in an ethanol fermentation process. Following separation of the germ, the magma of starch, proteinaceous gluten and bran can be milled to a fine particle size slurry and screened to remove the larger cellulosic bran fibers from the starch and gluten. If desired, the starch can be separated from the gluten with the starch being washed prior to discharge as an aqueous slurry containing from about 20 to about 50 weight percent dry substance (D.S.), and preferably from about 30 to about 40 weight percent D.S. Since recycled steepwater is used in each of the foregoing steps, all water soluble components of the grain being processed will be retained in the product slurry.

While the aqueous starch slurry produced in accordance with the present invention is advantageously converted to fermentable sugar by any of the known techniques, the starch hydrolysis processes of commonly assigned copending U.S. patent applications Ser. Nos. 043,191, filed May 29, 1979 and 052,037 filed June 25, 1979, are especially preferred. It is further preferred to convert the resulting fermentable sugar to ethanol by the fermentation process of commonly assigned copending U.S. patent application Ser. No. 043,190, filed May 29, 1979 and concentrating the ethanol by the anhydrous distillation process of commonly assigned copending U.S. patent application Ser. No. 043,189, filed May 29, 1979.

BRIEF DESCRIPTION OF THE DRAWING

The accompanying drawing is a diagrammatic flow sheet illustrative of one embodiment of a starch recovery process in accordance with the present invention. While the process is described in connection with the recovery of starch from dried, shelled corn, it is to be understood that recovery of starch from other cereal grains can be effected in essentially the same manner. The process contemplates the use of known and conventional equipment which is readily available from several suppliers.

DESCRIPTION OF THE PREFERRED EMBODIMENTS

Referring to the drawing, dried, cleaned shelled corn from storage introduced through line 10 into steep tank 11 is soaked therein for a period of time sufficient to soften the kernels for further processing (e.g., from about 24 to about 48 hours) in the presence of warm (e.g., about 120° F.) recycled process water entering steep tank 11 through line 46. A small amount of sulfur dioxide is commonly added to the steepwater to inhibit fermentation and to facilitate softening. At the end of the steeping process, the steepwater which contains much of the soluble protein, carbohydrates and minerals of the corn but which is substantially free from softened grain kernels is drawn off from steep tank 11 and conveyed through line 12 where it is used for the washing of the concentrated aqueous starch slurry flowing through multistage starch washing unit 53. From steep tank 11, the softened corn is coarsely ground in mill 13 freeing the oil-bearing germ without crushing it, and loosening the bran. The wet mascerated kernels are introduced through line 14 into one or more germ separators or, as shown, centrifugal hydrocyclones 15 and 19. Residual germ remaining with the kernels after being processed through primary centrifugal hydrocyclone 15 is conveyed through line 16 for an additional coarse milling treatment in mill 17 and the mill discharge is passed through line 18 to secondary centrifugal hydrocyclone 19. The aqueous germ slurry recovered in primay centrifugal hydrocyclone 15 is sent to the first of a series of screens, 21, with the overflow germ slurry being passed through line 22 to screen 23 and the underflow being discharged through line 24. The overflow germ slurry from screen 23 is passed through line 25 together with recycled process water through lines 46 and 26 to screen 27 and the underflow from screen 23 is discharged through line 28. The overflow from screen 27 contains substantially all of the germ component of the corn and is passed through line 29 to germ processing where the oil content of the germ is extracted. The underflow from screen 27 is recycled to screen 23 through lines 30 and 22. The minor amount of germ recovered in secondary centrifugal hydrocyclone 19 passing through line 31 together with screen underflows passing through lines 24 and 28 are recycled to primary centrifugal hydrocyclone 15 through line 14. The remaining aqueous slurry of starch, gluten and bran (hull) which is discharged from secondary centrifugal hydrocyclone 19 is conveyed through line 32 to mill 33 wherein it is finely ground. The slurry discharge from mill 33 is then passed through line 34 to multistage fiber wash system 35 supplied with recycled process water from centrifugal separator 61 through line 62. The washed fiber slurry from multistage fiber wash system 35 is conveyed through line 36 to centrifuge 37, the fiber slurry being discharged through line 38 to fiber press 39 with the fiber from the latter being discharged through line 40. Process water from centrifuge 37 is returned to the fiber wash system through line 41 and process water recovered from fiber press 39 is returned to the centrifuge through line 42. The aqueous slurry of starch and gluten from multistage fiber wash system 35 is introduced through line 43 to the first of a series of high speed centrifugal separators, 44, wherein separation of the relatively heavy starch particles from the lighter gluten takes place. The starch and gluten free process water from separator 44 is recycled through lines 45 and 46 to steep tank 11 for soaking an additional quantity of corn kernels. The concentrated aqueous starch and gluten slurry from separator 44 is conveyed through line 47 to high speed centrifugal separator 48 provided with fresh water make-up through line 49, with the gluten slurry discharge being passed through line 50 to high speed centrifugal separator 51 and the gluten free starch slurry being passed through line 52 to multistage washing system 53. The gluten free water recovered from separator 51 is recycled to steep tank 11 through lines 54 and 46 and the thick aqueous gluten slurry passing through line 55 is filtered in filtration unit 56, with the gluten cake obtained therefrom being passed through line 57 to gluten drier 58, the dried gluten being discharged therefrom through line 59. Process water recovered in filtration unit 56 is recycled through line 46 to steep tank 11. Process water from multistage starch washing system 53 discharged through line 60 is clarified in high speed centrifugal separator 61 prior to being used as wash water in multistage fiber wash system 35. The particle free process water recovered from separator 61 is recycled to the last stage of fiber wash system 35 through line 62 and the particle slurry is conveyed through line 63 to the first stage of fiber wash system 35. The germ, gluten and fiber free starch slurry from starch washing system 53 is delivered through line 64 to storage or, preferably, directly to a starch hydrolysis system for the manufacture of fermentable sugar.

In the process as aforedescribed, the recycle process water contains soluble carbohydrate, protein, inorganic salts, fats, etc., extracted from previously processed corn and since the amount of such solubles is in approximate balance with the amount of solubles contained in the corn undergoing processing, the quantities of solubles entering and leaving the latter will be about equal. Thus, substantially all of the soluble carbohydrate, protein and other soluble components of the corn will be retained therein throughout the process cycle and will be present in the product aqueous starch slurry.

The fiber separation and recovery sequence can be dispensed with herein when the product starch slurry is to be used as the starting material for saccharification since the fiber, being made up largely of cellulose, can be converted to fermentable sugar through hydrolysis. In this case, the starch, fiber and gluten effluent in line 34 can be passed directly to centrifugal separator 44, the remaining operations being carried out as aforedescribed except that the recovery system will be modified as required to reflect the absence of the fiber separation and recovery sequence 35–41. Thus, particle free process water from separator 61 can be recycled to steep tank 11 and the particle slurry from separator 61 can be introduced to separator 48. If desired, starch washing system 53 and separator 61 can also be eliminated with the starch slurry being discharged directly from starch separator 48. Moreover, if the starch slurry is to be used for the manufacture of sugar employed in ethanol fermentation, gluten separation and recovery sequence 48-59 can also be dispensed with since the amino acids, peptides and/or proteins derived from the gluten originally present in the starch prior to hydrolysis will provide nutrients useful for yeast metabolism. In this case, for which a material balance is hereinafter given, the concentrated starch and gluten slurry can be discharged through line 47 directly to a starch hydrolysis unit. The material balance of the streams flowing through certain of the aforementioned lines is predicated upon the wet milling of 30,000 bushels/day of dried corn kernals.

| WET MILLING MATERIAL BALANCE | | | |
|---|---|---|---|
| Line | 10 | 12 | 14 |
| Slurry/Fluid | Dried Corn Feed | Steep Liquor | Steeped Corn |
| Starch | 33.55 | — | 33.55 |
| Insoluble Protein | 3.19 | — | 3.19 |
| Water Soluble Protein | 1.42 | 1.42 | — |
| Oil | 2.06 | — | — |
| Lactic Acid | .80 | .80 | — |
| Water Soluble Carbonate | .31 | .31 | — |
| Ash | .55 | .55 | — |
| Other Components | 4.73 | — | — |
| Solids | 46.61 | 3.08 | 43.53 |
| Loss | .71 | | |
| Water | 8.68 | | |
| | 56.00 | | |

| WET MILLING MATERIAL BALANCE | | | |
|---|---|---|---|
| Line | 29 | 40 | 45 | 47 |
| Slurry/Fluid | Germ | Fiber | Process | Starch Slurry |
| Starch | 0.36 | .74 | — | 32.93 |
| Insoluble Protein | 0.51 | .56 | — | 2.12 |
| Water Soluble Protein | — | .17 | 6.44 | 1.24 |
| Oil | 1.82 | .12 | — | .12 |
| Lactic Acid | —.09 | 3.64 | .70 | |
| Water Soluble Carbonate | — | .04 | 1.40 | .27 |
| Ash | — | .06 | 2.52 | .49 |
| Other Components | 0.95 | 3.22 | — | .56 |
| Solids | 3.64 | 5.00 | 14.00 | 38.43 |
| Loss | | | | |

| -continued | | | |
|---|---|---|---|
| WET MILLING MATERIAL BALANCE | | | |
| Line | 29 | 40 | 45 | 47 |
| Slurry/Fluid | Germ | Fiber | Process | Starch Slurry |
| Water | 3.64 | 7.50 | 307.00 | 57.00 |
| Total | 7.28 | 12.50 | 321.00 | 95.43 |

What is claimed is:

1. In a process for wet milling cereal grain for the recovery of starch therefrom in which the cereal grain is soaked in steepwater to provide softened grain kernels, the softened grain kernels are coarsely milled to separate the germ from the bran, gluten and starch components thereof and germ free starch is recovered as an aqueous slurry with or without prior separation and recovery of bran and/or gluten, the improvement which comprises recovering the steepwater substantially free from softened grain kernels which contains dissolved components of the cereal grain, utilizing the recovered steepwater as process water for one or more steps of the wet milling process prior to recovery of the starch slurry, and recycling the process water to be used as steepwater for a subsequent starch recovery process.

2. The process of claim 1 wherein the cereal grain is corn.

3. The process of claim 1 wherein an amount of water is removed from the starch slurry to provide a concentrated aqueous starch slurry containing from about 20 to about 50 weight percent dry substance.

4. The process of claim 3 wherein an amount of water is removed from the starch slurry to provide a concentrated aqueous starch slurry containing from about 30 to about 40 weight percent dry substance.

5. The process of claim 1 wherein the process water contains about the same amount of soluble components extracted from previously processed grain as is contained in the grain undergoing processing.

6. The process of claim 1 wherein the starch slurry is introduced to a starch hydrolysis unit for the conversion of the starch to an aqueous solution of fermentable sugar.

7. The process of claim 6 wherein the aqueous solution of fermentable sugar contains substantially all of the soluble material of the aqueous starch slurry from which the fermentable sugar was obtained, said aqueous solution of fermentable sugar being introduced to a fermentation unit for conversion to ethanol.

8. The process of claim 1 wherein the recovered steep-water is used for washing the starch prior to discharge of the starch from the wet milling system.

* * * * *